(12) United States Patent
Parisi et al.

(10) Patent No.: US 7,083,388 B2
(45) Date of Patent: Aug. 1, 2006

(54) DOUBLE NEAR-NET FORGING OF ARTICLE

(75) Inventors: Francis B. Parisi, West Suffield, CT (US); Stephen M. Glinn, Simsbury, CT (US); Carl W. Mercier, Willington, CT (US)

(73) Assignee: United Technologies Corporation, Hartford, CT (US)

( * ) Notice: Subject to any disclaimer, the term of this patent is extended or adjusted under 35 U.S.C. 154(b) by 126 days.

(21) Appl. No.: 10/835,035

(22) Filed: Apr. 29, 2004

(65) Prior Publication Data

US 2005/0244273 A1 Nov. 3, 2005

(51) Int. Cl.
 *F01D 5/14* (2006.01)
 *B21D 53/78* (2006.01)
(52) U.S. Cl. ............... 416/223 A; 29/889.7; 29/889.72
(58) Field of Classification Search ................ 416/232, 416/223 A, 2, 233, 241 R; 29/889.7, 889.72
See application file for complete search history.

(56) References Cited

U.S. PATENT DOCUMENTS

| | | | |
|---|---|---|---|
| 3,628,226 A | 12/1971 | Nelson | |
| 3,936,920 A | 2/1976 | Conn, Jr. | |
| 4,364,160 A | 12/1982 | Eiswerth et al. | |
| 4,815,939 A * | 3/1989 | Doble | 416/233 |
| 5,152,059 A * | 10/1992 | Midgley | 29/889.7 |
| 6,705,011 B1 | 3/2004 | Leibfried et al. | |
| 6,739,049 B1 * | 5/2004 | Nicholson | 29/889.72 |

OTHER PUBLICATIONS

European Search Report for EP Patent Appln. 05252704.1.

* cited by examiner

*Primary Examiner*—Edward K. Look
*Assistant Examiner*—Richard A. Edgar
(74) *Attorney, Agent, or Firm*—Bachman & LaPointe, P.C.

(57) ABSTRACT

A method of forming a blade comprising the steps of forging a part comprising a suction side, a pressure side, and a dividing portion of material greater than a portion of material to be sacrificed between the suction side and the pressure side, splitting the part through the dividing portion of material to form a suction side inner surface and a pressure side inner surface, and joining the suction side inner surface and the pressure side inner surface to form the blade.

22 Claims, 2 Drawing Sheets

DOUBLE NEAR-NET FORGING OF ARTICLE

U.S. GOVERNMENT RIGHTS

The invention was made with U.S. Government support under contract F33657-98-C-2004 awarded by the U.S. Government. The U.S. Government has certain rights in the invention.

BACKGROUND OF THE INVENTION (1) Field of the Invention

The present invention relates to a method for forging articles requiring a single forging such as hollow fan blades for gas turbine engines.

(2) Description of the Related Art

It is current practice to fabricate hollow fan blades, typically fabricated from titanium, for use in gas turbine engines. It is preferable that such fan blades be hollow. By fabricating hollow fan blades, the mass of the fan blades may be substantially reduced resulting in notable efficiencies. Typically the hollow fan blade halves are forged separately, one half corresponding to the pressure side with the other corresponding to the suction side. Once forged, each half is substantially machined to create the airfoil contour, the airfoil root block, datum features such as holes, hollow cavities, and diffusion bond surfaces. As noted this is done for both the pressure side and the suction side from each oversize "pancake" forging. The suction side and the pressure side are then subsequently diffusion bonded together to make a single hollow fan blade.

The use of diffusion bonding in turbine blade formation is well known. An example may be found in U.S. Pat. No. 5,711,068, the disclosures of which is incorporated by reference herein as if set forth at length. The '068 patent discloses a specific situation in which two blade halves are cut from a single piece and are diffusion bonded with uncut surfaces facing each other.

Such a process requires extensive machining time to achieve both the airfoil contour and the root block. In addition, a significant amount of scrap titanium is generated. What is therefore needed is a method for forging hollow fan blades, particularly titanium fan blades, which requires less machining and results in a reduction in the amount of scrap titanium generated.

SUMMARY OF THE INVENTION

Accordingly, it is an object of the present invention to provide a method for forging articles requiring a single forging.

In accordance with the present invention, a method of forming a blade comprises the steps of forging a part comprising a suction side, a pressure side, and a dividing portion of material greater than a portion of material to be sacrificed between the suction side and the pressure side, splitting the part through the dividing portion of material to form a suction side inner surface and a pressure side inner surface, and joining the suction side inner surface and the pressure side inner surface to form the blade.

In further accordance with the present invention, a forged part comprises a suction side, a pressure side, and a dividing portion of material between the suction side and the pressure side the dividing portion of a width greater than or equal to a separation destruction width.

In further accordance with the present invention, a method for forming a part comprises the steps of providing a mold, forging a part in the mold the part having a suction side, a pressure side, and a dividing portion of material between the suction side and the pressure side the dividing portion of a width greater than or equal to a separation destruction width.

DETAILED DESCRIPTION

It is therefore a teaching of the present invention to provide a method for forging articles such as hollow fan blades, particularly titanium fan blades, requiring a minimum of post forging machining therefore significantly reducing the amount of scrap titanium generated. This is accomplished by forging a single part comprised of a pressure side and a suction side separated by a dividing portion of material. The dividing portion of material is only slightly larger than that which is needed to permit the suction side and the pressure side to be separated by a cutting operation. Once cut and separated, the suction side and the pressure side may be machined, particularly to include hollow cavities, then attached to one another through a process of diffusion bonding to produce a hollow part.

Figure 1:
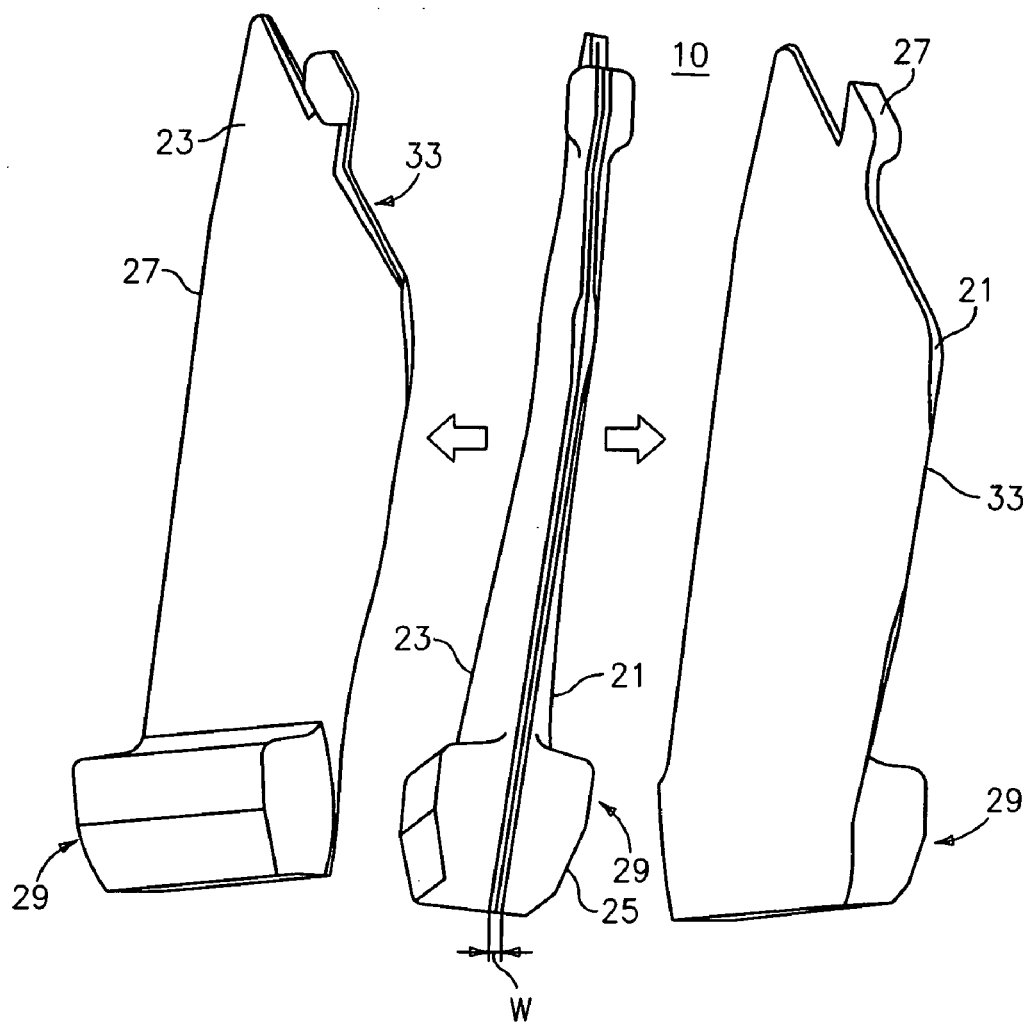
FIG. 1 An illustration of the part of the present invention post forging and both pre and post separation.

With reference to FIG. 1, there is illustrated the construction of the part 10. Part 10, preferably utilized to create a fan blade, is comprised of a suction side 21 and a pressure side 23 separated by a dividing portion of material 25.

The forging process is performed such that the outer surfaces of suction side 21 and pressure side 23 are of a shape requiring little or no post forging processing to achieve a finished exterior surface. Typically, the amount of material removed during post forging processing ranges on average from 0.030 inches to 0.125 inches. In particular, the root block 29 and diffusion bond face feature 27 are forged in a substantially finished form suitable for machining so as to enable the bonding of the part 10 to a hub. The temperatures and pressures under which the forgings are performed vary depending on the desired mechanical properties of the finished part and are known in the art. Specifically, the temperatures and pressures for the forgings are selected to produce a finished part which exhibits desired tensile and compressive strengths as well as sufficient low and high cycle fatigue resistance.

Root block 29 is formed of an amount of manufacturing material intended to be sacrificed during post-diffusion bonding machining. Specifically, root block 29 is not forged into a finished form, but, rather, is intended to be machined. In a preferred embodiment, root block 29 is constructed to allow for the part 10 to be gripped and friction welded to a hub or other receiving fixture. After friction welding part 10 to the hub, the remaining portion of root block 29 is machined off so as to leave a clean airfoil extending smoothly along the expanses formed by each of suction side 21 and pressure side 23.

Figure 2:
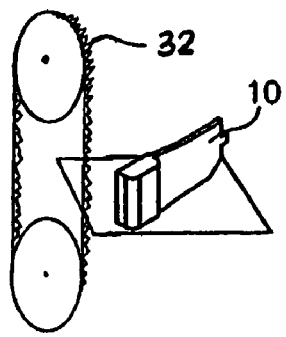
FIG. 2 An illustration of the part of the present invention and the cutting apparatus.

As noted, located between pressure side 23 and suction side 21 is a dividing portion of material 25. As illustrated, dividing portion of material 25 is of a width w. Width w is chosen depending upon the method by which pressure side 23 is to be separated from suction side 21. Preferably, pressure side 23 is separated from suction side 21 by cutting through and along dividing portion of material 25 with a band saw 31 as illustrated in FIG. 2. Alternative methods include, but are not limited to, utilizing a water jet, or employing wire EDM. Each of the above-noted cutting methodologies results in a cut which destroys an approximately uniform width of material in the direction of the cut. As a result, the width, w, of the dividing portion of material 25 should be equal to, or preferably greater than, the separation destruction width of the cutting technology utilized. As used herein "separation destruction width" refers to the width of material which is sacrificed when employing a chosen methodology for cutting. In a preferred embodiment, the width, w, of dividing portion of material is approximately 10–20% wider than the separation destruction width.

Figure 4:
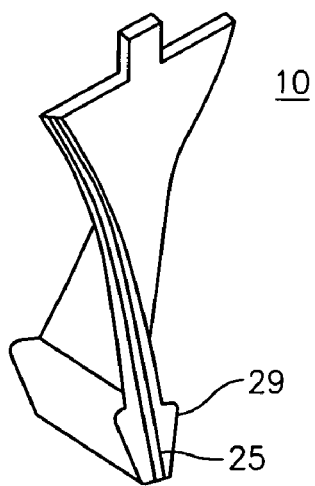
FIG. 4 An illustration of the part of the present invention showing a non-planar dividing portion.

In a preferred embodiment, the dividing portion of material 25 forms a generally planar expanse. In such an instance, all of the above identified methods of cutting dividing portion of the material 25 may be utilized to achieve a generally planar cut. With reference to FIG. 4, there is illustrated a part 10 of the present invention wherein the dividing portion of the material 25 does not form a generally planar expanse. Rather, dividing portion 25 generally follows the twisting contours of both suction side 21 and pressure side 23. In such an instance, it is possible to program the operation of a wire EDM to alter its orientation as the cut along dividing portion 25 progresses so as to effectively remove dividing portion 25.

Preferably, part 10 is fabricated from titanium. However, part 10 may be formed of any metallic material exhibiting desired tensile and compressive strength as well as sufficient low and high cycle fatigue resistance. Such metals include, but are not limited to, titanium based alloys, forgeable alloys, aluminum, and steels.

With continued reference to FIG. 1, there is illustrated both suction side 21 and pressure side 23 post forging and post separation utilizing a cutting technique as described above. Once cut and separated, both suction side 21 and pressure side 23 possess an inner surface 33. Inner surface 33 is subsequently machined to contain at least one cavity 31 as illustrated with reference to FIG. 3. Preferably, each cavity formed into the inner surface 33 of suction side 21 has an associated, reciprocating cavity machined into the inner surface 33 of the opposing pressure side 23. By reciprocating cavity, it is meant that when suction side 21 and pressure side 23 are aligned and joined through the process of diffusion bonding, a cavity 31 located on the inner surface of suction side 21 is aligned with a cavity 31 fabricated into the inner surface 33 of pressure side 23 such that one continuous cavity is formed inside the bonded part 10. The fabrication of such cavities adds strength and resistance to deformation to the post-bonded part 10.

While described with reference to reciprocating cavities 31, the present invention is not so limited. Rather, the present invention encompasses any and all cavities, including cooling microcircuits, which may be fabricated into the inner surfaces of suction side 21 and pressure side 23.

Figure 3:
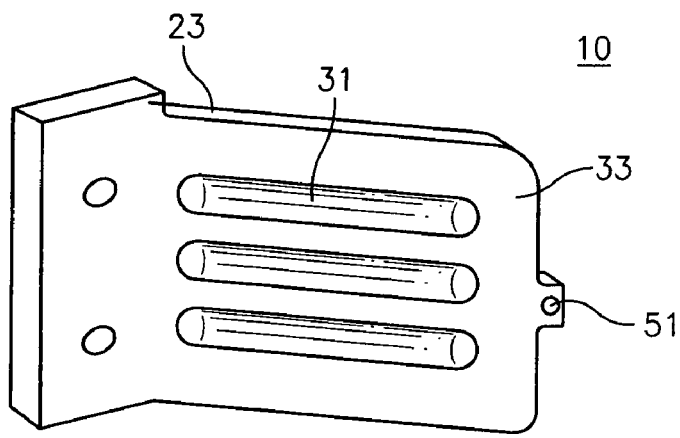
FIG. 3 An illustration of the cavities fabricated in the inner surfaces of the present invention.

With continued reference to FIG. 3, at least two alignment holes 51 are drilled or otherwise machined through both suction side 21 and pressure side 23 post forging and separation. The alignment holes 51 are used to precisely align the inner surfaces 33 of the suction side 21 and pressure side 23 for diffusion bonding. It is therefore important that the alignment holes are drilled in precisely the desired location.

Figure 5:
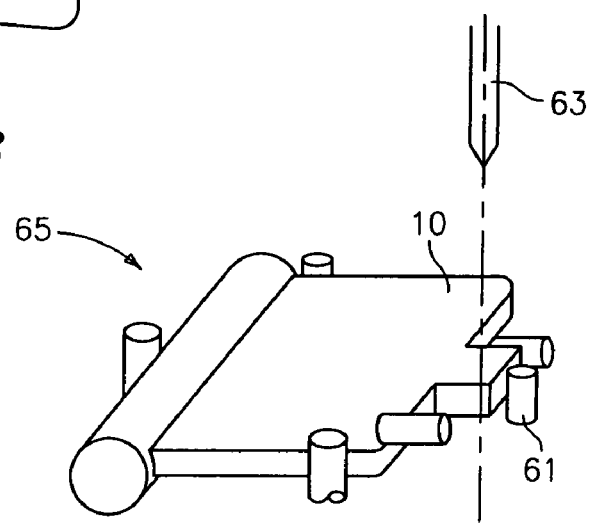
FIG. 5 An illustration of the six point trap of the present invention.
Figure 6:
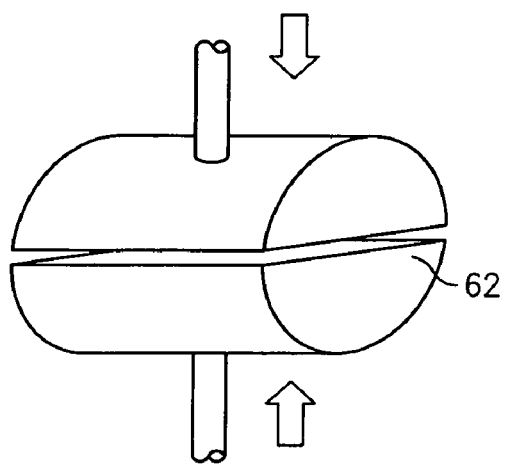
FIG. 6 An illustration of the mold of the present invention.

Referring now to FIGS. 5 and 6, it is therefore common practice to place the both the suction side 21 and the pressure side 23 in a six point trap 65 formed of at least six traps 61 and configured for use with either the suction side 21 or the pressure side 23. Each of the traps 61 restricts the part from movement in one of the six degrees of motion (three translational and three rotational). Because the part 10 is forged such that the exterior surfaces of both the suction side 21 and the pressure side 23 are in near finished condition (i.e. "near net"), they may each be placed in their respective six point traps 65 in a manner which precisely controls the orientation and placement of the sides 21, 23. A drilling mechanism 63 may then be positioned to precisely drill holes in the side 21, 23. As noted, these holes are then used to align the suction side 21 with the pressure side 23 for diffusion bonding to each other using a mold 62 as shown in FIG. 6.

It is apparent that there has been provided in accordance with the present invention a method for forging hollow blades requiring a single forging which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of forming an article comprising the steps of:
    forging a part comprising a suction side, a pressure side, and a dividing portion of material greater than a portion of material to be sacrificed between said suction side and said pressure side;
    splitting said part through said dividing portion of material to form a suction side inner surface and a pressure side inner surface; and
    joining said suction side inner surface and said pressure side inner surface to form said blade.

2. The method of claim 1 comprising the additional step of machining at least one of said suction side inner surface and said pressure side inner surface to form at least one cavity.

3. The method of claim 2 wherein said machining said at least one of said suction side inner surface and said pressure side inner surface comprises machining at least one reciprocating cavity into said suction side inner surface and said pressure side inner surface.

4. The method of claim 1 wherein said forging said part comprises forging said part comprising a root block and at least one diffusion bond face feature.

5. The method of claim 1 wherein said forging said part comprises forging said part wherein said dividing portion of material has a width between 10% and 20% greater than a separation destruction width.

6. The method of claim 1 wherein said splitting said part comprises using a cutting apparatus selected from the group consisting of a band saw, a water jet, and a wire EDM.

7. The method of claim 1 wherein said splitting said part comprises splitting said part along a generally planar expanse.

8. The method of claim 1 wherein said splitting said part comprises splitting said part along a generally non-planar expanse.

9. The method of claim 1 wherein said joining said suction side inner surface and said pressure side inner surface to form said blade comprises using diffusion bonding.

10. The method of claim 1 wherein said forging said part comprises forging said part from a material selected from the group consisting of titanium, titanium based alloys, forgeable alloys, aluminum, and steels.

11. The method of claim 1 wherein said forging said part comprises forging said suction side and said pressure side so as to approximate a finished exterior surface.

12. The method of claim 1 comprising the additional steps of:
   drilling at least two alignment holes in each of said suction side and said pressure side;
   aligning said suction side and said pressure side using said alignment holes; and
   diffusion bonding said suction side to said pressure side.

13. The method of claim 12 wherein said drilling comprises placing said suction side in a first six point trap and placing said pressure side in a second six point trap.

14. A forged part comprising:
   a suction side;
   a pressure side; and
   a dividing portion of material between said suction side and said pressure side said dividing portion of a width greater than or equal to a separation destruction width, wherein said pressure side and said suction side approximate a finished exterior surface.

15. The forged part of claim 14 said separation destruction width is equal to a width of material sacrificed by a means for cutting.

16. The forged part of claim 14 wherein said forged part is comprised predominantly of titanium.

17. The forged part of claim 14 wherein said width of said dividing portion of material is between approximately 10% and 20% greater than said separation destruction width.

18. The forged part of claim 14 additionally comprising a root block and at least one diffusion bond face feature.

19. The forged part of claim 14 wherein said suction side comprises the suction side of a fan blade.

20. The forged part of claim 14 wherein said pressure side comprises the pressure side of a fan blade.

21. A method for forming a part comprising the steps of:
   providing a mold;
   forging a part in said mold said part having a suction side, a pressure side, and a dividing portion of material between said suction side and said pressure side said dividing portion of a width greater than or equal to a separation destruction width, and said pressure side and said suction side approximate a finished exterior surface.

22. A forging to produce a blade, comprising:
   an airfoil section having a near-net shape and comprising a suction side, a pressure side, and a dividing portion of material greater than a portion of material to be sacrificed between said suction side and said pressure side; and
   a root section having sacrificial material that is removed in a subsequent manufacturing step.

* * * * *